(12) United States Patent
Tsuji et al.

(10) Patent No.: US 11,770,504 B2
(45) Date of Patent: Sep. 26, 2023

(54) PERSON DETECTION DEVICE AND PERSON DETECTION METHOD

(71) Applicant: OMRON Corporation, Kyoto (JP)

(72) Inventors: Ayana Tsuji, Kusatsu (JP); Kiyoaki Tanaka, Otsu (JP); Jumpei Matsunaga, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 91 days.

(21) Appl. No.: 17/294,755

(22) PCT Filed: Nov. 1, 2019

(86) PCT No.: PCT/JP2019/043051
§ 371 (c)(1),
(2) Date: May 18, 2021

(87) PCT Pub. No.: WO2020/137160
PCT Pub. Date: Jul. 2, 2020

(65) Prior Publication Data
US 2022/0019768 A1   Jan. 20, 2022

(30) Foreign Application Priority Data

Dec. 27, 2018  (JP) ................. 2018-245230

(51) Int. Cl.
*G06V 40/16*  (2022.01)
*H04N 7/18*  (2006.01)
(Continued)

(52) U.S. Cl.
CPC ........... *H04N 7/183* (2013.01); *G06V 10/147* (2022.01); *G06V 20/53* (2022.01); *G06V 40/103* (2022.01); *G06V 40/164* (2022.01); *G06V 40/172* (2022.01)

(58) Field of Classification Search
CPC .. G06V 40/172; G06V 40/164; G06V 10/147; G06V 20/53; G06V 40/103;
(Continued)

(56) References Cited

U.S. PATENT DOCUMENTS

2010/0021008 A1* 1/2010 Shaick ................ G06V 40/166
382/118
2015/0146010 A1* 5/2015 Yokozeki ........... H04N 5/23218
348/169

(Continued)

FOREIGN PATENT DOCUMENTS

| JP | 2015210702 A | 11/2015 |
| JP | 2016039539 A | 3/2016 |
| WO | 2017182225 A1 | 10/2017 |

OTHER PUBLICATIONS

International Search Report issued in Intl. Appln. No PCT/JP2019/043051 dated Jan. 21, 2020. English translation provided.
(Continued)

*Primary Examiner* — Nimesh Patel
(74) *Attorney, Agent, or Firm* — ROSSI, KIMMS & McDOWELL LLP (57) ABSTRACT

A person detection device configured to analyze a fisheye image obtained by a fisheye camera installed above a to-be-detected area to detect a person existing in the to-be-detected area includes a human body detector configured to detect a human body candidate from a fisheye image and output, as a detection result, a bounding box indicating a region on the fisheye image of each human body candidate detected, a reference storage configured to prestore a reference for a shape and/or size of the bounding box for each position or area on the fisheye image, and a false detection determining unit configured to compare the shape and/or size of the bounding box of the human body candidate contained in the detection result with the reference corre- (Continued)

sponding to a position where the human body candidate is detected to determine whether the human body candidate results from false detection.

9 Claims, 8 Drawing Sheets

(51) Int. Cl.
*G06V 10/147* (2022.01)
*G06V 20/52* (2022.01)
*G06V 40/10* (2022.01)

(58) Field of Classification Search
CPC .... G06V 10/40; G06V 10/443; G06V 10/462; G06V 10/50; G06V 10/75; G06V 10/806; G06V 40/10; G06V 40/161; G06V 40/165; H04N 7/183; H04N 5/23219; H04N 5/23238; A61B 5/7267; A61B 3/111; A61B 5/107; A61B 2576/00; A61B 5/1072; A61B 5/1127; A63B 2024/0025; A63B 2220/806; A63B 2220/836; A63B 2225/50; A63B 2225/54; A63B 24/0021; A63B 71/0605; G06F 21/30; G06K 9/6269; G06K 9/6282; G06K 9/629; G06K 9/6292; G06T 19/20; G06T 2207/10016; G06T 2207/20021; G06T 2207/30201; G06T 2207/30204; G06T 7/73; G06T 7/90

See application file for complete search history.

(56) References Cited

U.S. PATENT DOCUMENTS

| | | | |
|---|---|---|---|
| 2015/0312498 A1 | 10/2015 | Kawano | |
| 2016/0028951 A1* | 1/2016 | Mayuzumi | G02B 13/0015 348/36 |
| 2019/0130215 A1 | 5/2019 | Kaestle | |
| 2021/0321034 A1* | 10/2021 | Okamoto | G06V 40/18 |

OTHER PUBLICATIONS

Written Opinion issued in Intl. Appln. No. PCT/JP2019/043051 dated Jan. 21, 2020. English translation provided.

* cited by examiner

PERSON DETECTION DEVICE AND PERSON DETECTION METHOD

TECHNICAL FIELD

The present invention relates to a technique for detecting a person using an image captured by a fisheye camera.

BACKGROUND ART

The fields of building automation (BA) and factory automation (FA) require an application that automatically measures the "number", "position", "flow line", and the like of people using an image sensor and optimally control equipment such as lighting or air conditioner. In such an application, in order to acquire image information on as large an area as possible, an ultra-wide-angle camera equipped with a fisheye lens (referred to as a fisheye camera, an omnidirectional camera, or a 360-degree camera, each of which being of the same type, and the term "fisheye camera" is used herein) is often used.

An image taken by such a fisheye camera is highly distorted. Therefore, in order to detect a human body, a face, or the like from the image taken by the fisheye camera (hereinafter referred to as a "fisheye image"), a method under which the fisheye image is developed in a plane in advance to eliminate distortion as much as possible and then subjected to the detection processing is commonly used (see Patent Document 1).

PRIOR ART DOCUMENT

Patent Document

Patent Document 1: Japanese Unexamined Patent Publication No. 2016-39539

SUMMARY OF THE INVENTION

Problems to be Solved by the Invention

The related art, however, has the following problems. One of the problems is an increase in overall processing cost due to the preprocessing of developing the fisheye image in a plane. This makes real-time detection processing difficult and may lead to delays in device control, which is not preferable. The other problem is a risk of false detection due to significant deformation or division, caused by processing during the plane development, of an image of a person or object existing at a boundary (image break) at the time of plane development such as directly below the fisheye camera.

In order to avoid the problems, the present inventors have been studied an approach under which the fisheye image is subjected to the detection processing as it is (that is, "without plane development"). However, compared to an image taken by a normal camera, the fisheye image is large in variations of appearance of a to-be-detected person (an inclination, distortion, size of a human body), which makes detection difficult. In particular, when assuming an application such as BA or FA, there are many objects such as a chair, a personal computer, a trash can, an electric fan, and a circulator that tend to be misrecognized as a human body or head in the image, which leads to a reduction in detection accuracy.

The present invention has been made in view of the above-described circumstances, and it is therefore an object of the present invention to provide a technique for detecting a person from a fisheye image at high speed and with high accuracy.

Means for Solving the Problem

The present invention employs the following configuration in order to achieve the above-described object.

Provided according to a first aspect of the present invention is a person detection device configured to analyze a fisheye image obtained by a fisheye camera installed above a to-be-detected area to detect a person existing in the to-be-detected area, the person detection device including a human body detector configured to detect a human body candidate from a fisheye image and output, as a detection result, a bounding box indicating a region on the fisheye image of each human body candidate detected, a reference storage configured to prestore a reference for a shape and/or size of the bounding box for each position or area on the fisheye image, and a false detection determining unit configured to compare the shape and/or size of the bounding box of the human body candidate contained in the detection result with the reference corresponding to a position where the human body candidate is detected to determine whether the human body candidate results from false detection.

The "fisheye camera" is a camera that is equipped with a fisheye lens and is capable of taking an image with an ultra-wide angle as compared with a normal camera. Examples of the fisheye camera include an omnidirectional camera and a 360-degree camera. The fisheye camera may be installed to be directed downward from above the to-be-detected area. Typically, the fisheye camera is installed to have its optical axis directed vertically downward, but the optical axis of the fisheye camera may be inclined with respect to the vertical direction. The "human body" may be the whole body of a person or the half body (such as an upper body, a head, or a torso). The "bounding box" is a closed figure or a frame line indicating the region of the human body candidate, and a figure such as a polygon or an ellipse surrounding the region of the human body candidate may be used as the bounding box.

According to the present invention, making the false detection determination under a simple method for verifying the validity of the shape or size of the bounding box of the detected human body candidate allows highly accurate person detection to be made in a simple manner. Moreover, the elimination of the need for preprocessing such as plane development of the fisheye image allows high-speed processing.

The reference for the shape of the bounding box may include a reference for an aspect ratio of the bounding box. This is because the aspect ratio of the bounding box changes in a manner that depends on a change in angle of depression or azimuth when the human body is viewed from the fisheye camera according to a position on the fisheye image. For example, the reference for the aspect ratio may be set to cause the bounding box to have an approximately square shape in a center area of the fisheye image and in an area located at an angle of 45 degrees with respect to the center area, to cause the bounding box to have a vertically long rectangular shape in upper and lower areas relative to the center area, and to cause the bounding box to have a horizontally long rectangular shape in left and right areas relative to the center area.

The reference for the size of the bounding box may include a reference for an area of the bounding box. This is because the area of the bounding box changes in a manner that depends on a change in distance from the fisheye camera to the human body according to a position on the fisheye image. For example, the reference for the area may be set to make the area larger when the area is located closer to a center of the fisheye image.

The false detection determining unit may eliminate, from the detection result, a human body candidate determined to be a result of false detection. Alternatively, when the detection result contains information on reliability of each human body candidate detected, the false detection determining unit may lower the reliability of a human body candidate determined to be a result of false detection.

Provided according to a second aspect of the present invention is a person detection method for analyzing a fisheye image obtained by a fisheye camera installed above a to-be-detected area to detect a person existing in the to-be-detected area, the person detection method including the steps of detecting a human body candidate from a fisheye image and outputting, as a detection result, a bounding box indicating a region on the fisheye image of each human body candidate detected, and comparing, by consulting a reference storage configured to prestore a reference for a shape and/or size of the bounding box for each position or area on the fisheye image, the shape and/or size of the bounding box of the human body candidate contained in the detection result with the reference corresponding to a position where the human body candidate is detected to determine whether the human body candidate results from false detection.

The present invention may be regarded as a person detection device including at least some of the above-described components, a person recognition device that recognizes (identifies) a detected person, a person tracking device that tracks a detected person, an image processing device, or a monitoring system. Further, the present invention may be regarded as a person detection method, a person recognition method, a person tracking method, an image processing method, or a monitoring method, each of which including at least some of the above-described processes. Further, the present invention may be regarded as a program for implementing such a method or a non-transitory recording medium that records the program. It should be noted that the above-described units and processing may be combined with each other to an allowable degree to form the present invention.

Effect of the Invention

According to the present invention, a person can be detected from a fisheye image at high speed and with high accuracy.

MODE FOR CARRYING OUT THE INVENTION

Application Example

Figure 1:
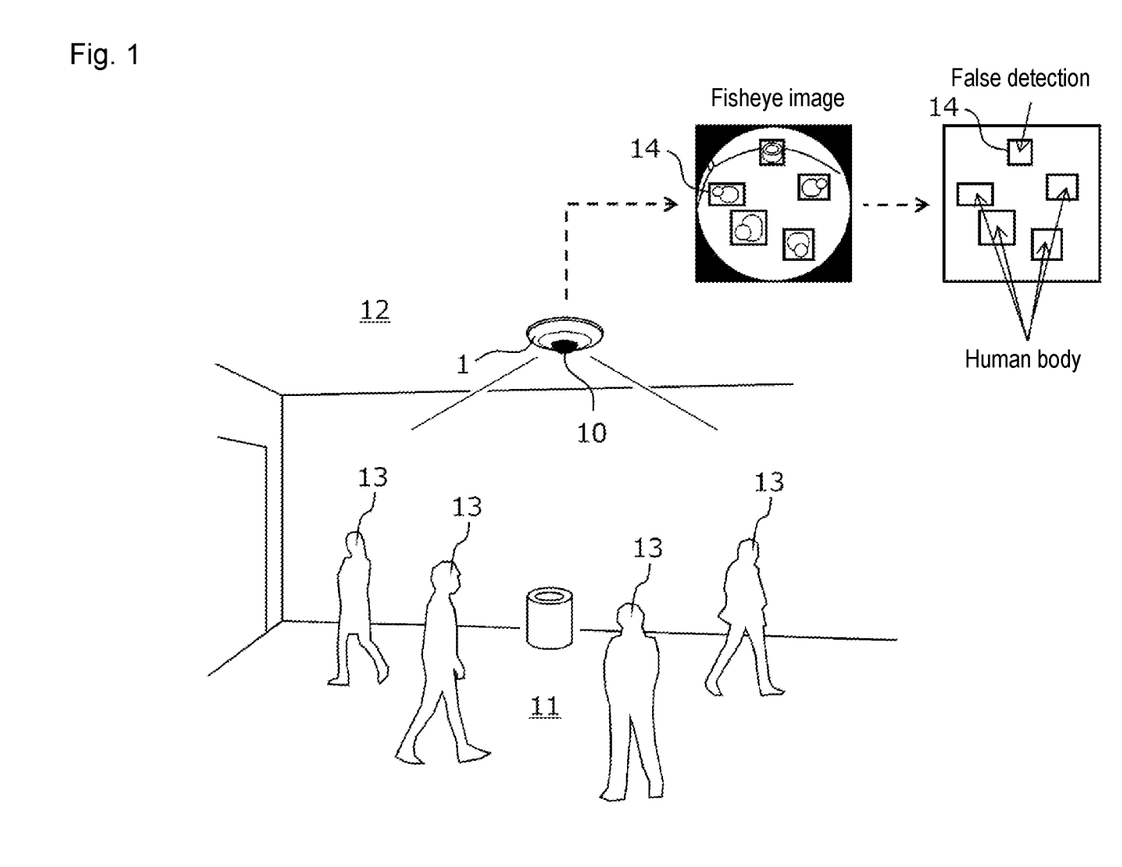
FIG. 1 is a diagram showing an application example of a person detection device according to the present invention.

A description will be given of an application example of a person detection device according to the present invention with reference to FIG. 1. A person detection device 1 analyzes a fisheye image obtained by a fisheye camera 10 installed above a to-be-detected area 11 (for example, on a ceiling 12) to detect a person 13 existing in the to-be-detected area 11. The person detection device 1 detects, recognizes, and tracks the person 13 passing through the to-be-detected area 11, for example, in an office or a factory. In the example shown in FIG. 1, respective regions of four human bodies detected from the fisheye image are each represented by a bounding box 14 having a quadrilateral shape. A detection result from the person detection device 1 is output to an external device for use in, for example, counting the number of people, controlling various devices such as lighting and air conditioner, and keeping a suspicious person under observation.

When the fisheye camera 10 takes a bird's-eye image of the to-be-detected area 11, an appearance (image) of a human body significantly changes in a manner that depends on a positional relationship with the fisheye camera 10. Therefore, the fisheye image tends to cause the bounding box 14 to change in shape or size in a manner that depends on a detection position on the image. The person detection device 1 is characterized as being capable of making, with consideration given to such characteristics of the fisheye image, a false detection determination under a simple method for verifying the validity of the shape or size of the bounding box 14 of a detected human body candidate to determine whether the human body candidate results from false detection. The person detection device 1 is further characterized as being capable of using the fisheye image as it is (that is, without preprocessing such as plane development or elimination of distortion) for person detection processing.

<Characteristics of Fisheye Image>

Figure 2:
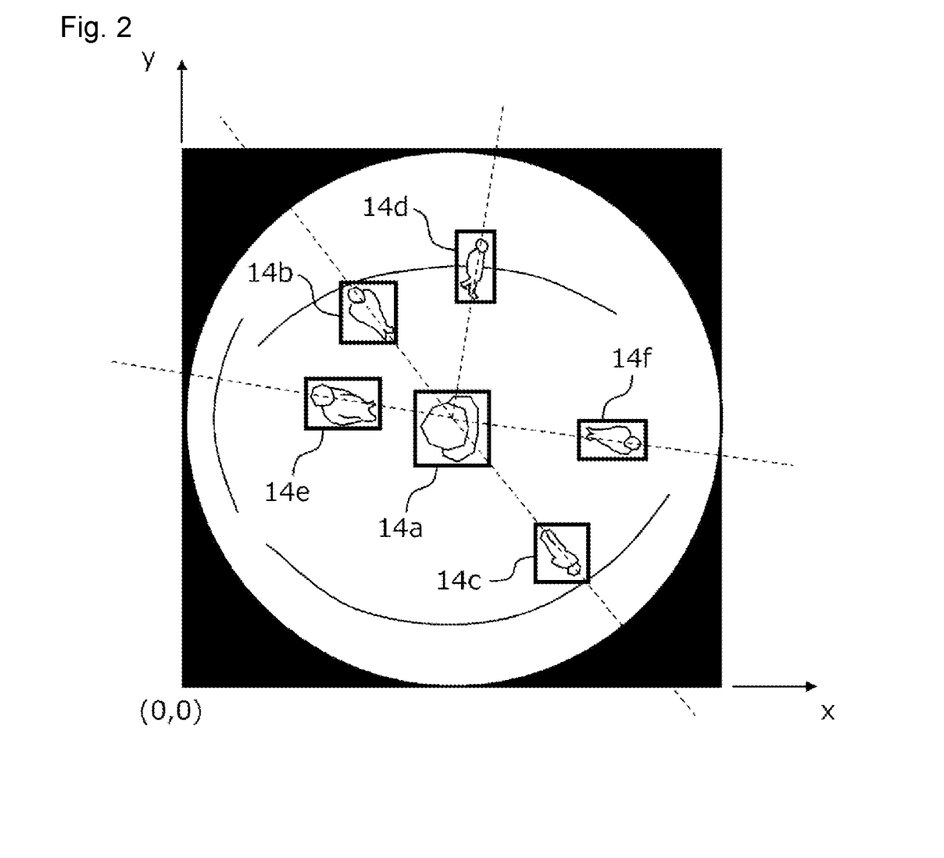
FIG. 2 is a diagram showing an example of a fisheye image and a bounding box.

FIG. 2 shows an example of the fisheye image captured from the fisheye camera 10. An image coordinate system has an origin (0,0) at a lower left corner of the fisheye image, an x-axis extending rightward along a horizontal direction, and a y-axis extending upward along a vertical direction.

When the fisheye camera 10 is installed with an optical axis directed vertically downward, an image, in top view, of a person located directly below the fisheye camera 10 appears in a center of the fisheye image. Then, an angle of depression becomes smaller toward an edge of the fisheye image, and an image of the person appears in top oblique view. Further, a human body appearing in the fisheye image has its feet located near the center of the image and has its head located near the edge of the image, and is approximately parallel to a radial line (a dashed line shown in FIG. 2) passing through the center of the image. Further, the center of the fisheye image is less prone to distortion, and image distortion increases toward the edge of the fisheye image.

Reference numerals 14a to 14f each denote a bounding box disposed to surround a region of the human body in the fisheye image. According to the embodiment, for convenience of image processing, a bounding box having a quadrilateral shape with four sides parallel to the x-axis or the y-axis is used.

As shown in FIG. 2, the bounding box (for example, 14a) located in a center area of the fisheye image has an approximately square shape. Further, the bounding box (for example, 14b, 14c) located in an area at an angle of 45 degrees with respect to the center area also has an approximately square shape. The bounding box (for example, 14d) located in upper and lower areas relative to the center area has a vertically long rectangular shape (rectangular shape with long sides parallel to the y-axis). The closer to the center of the image, the more the bounding box becomes approximate to a square shape, and the farther away from the center of the image, the more the bounding box becomes approximate to a vertically long shape. The bounding box (for example, 14e, 14f) located in left and right areas relative to the center area has a horizontally long rectangular shape (rectangular shape with long sides parallel to the x-axis). The closer to the center of the image, the more the bounding box becomes approximate to a square shape, and the farther away from the center of the image, the more the bounding box becomes approximate to a horizontally long shape.

As described above, the fisheye image has a characteristic by which the shape (for example, the aspect ratio) of the bounding box changes in a manner that depends on the orientation relative to and the distance from the center of the image. The aspect ratio of the bounding box for each position or area on the fisheye image can be geometrically calculated (predicted) based on optical characteristics of the fisheye camera 10, a positional relationship between the fisheye camera 10 and the to-be-detected area 11, and the average human body size.

Further, as shown in FIG. 2, the size of the human body appearing in the fisheye image is the largest at the center of the fisheye image, and the closer to the edge of the fisheye image, the smaller the size of the human body. That is, the fisheye image has a characteristic by which the size (for example, the area) of the bounding box changes in a manner that depends on the distance from the center of the image (the greater the distance, the smaller the size). The area of the bounding box for each position or area on the fisheye image can be also geometrically calculated (predicted) based on the optical characteristics of the fisheye camera 10, the positional relationship between the fisheye camera 10 and the to-be-detected area 11, and the average human body size.

<Monitoring System>

Figure 3:
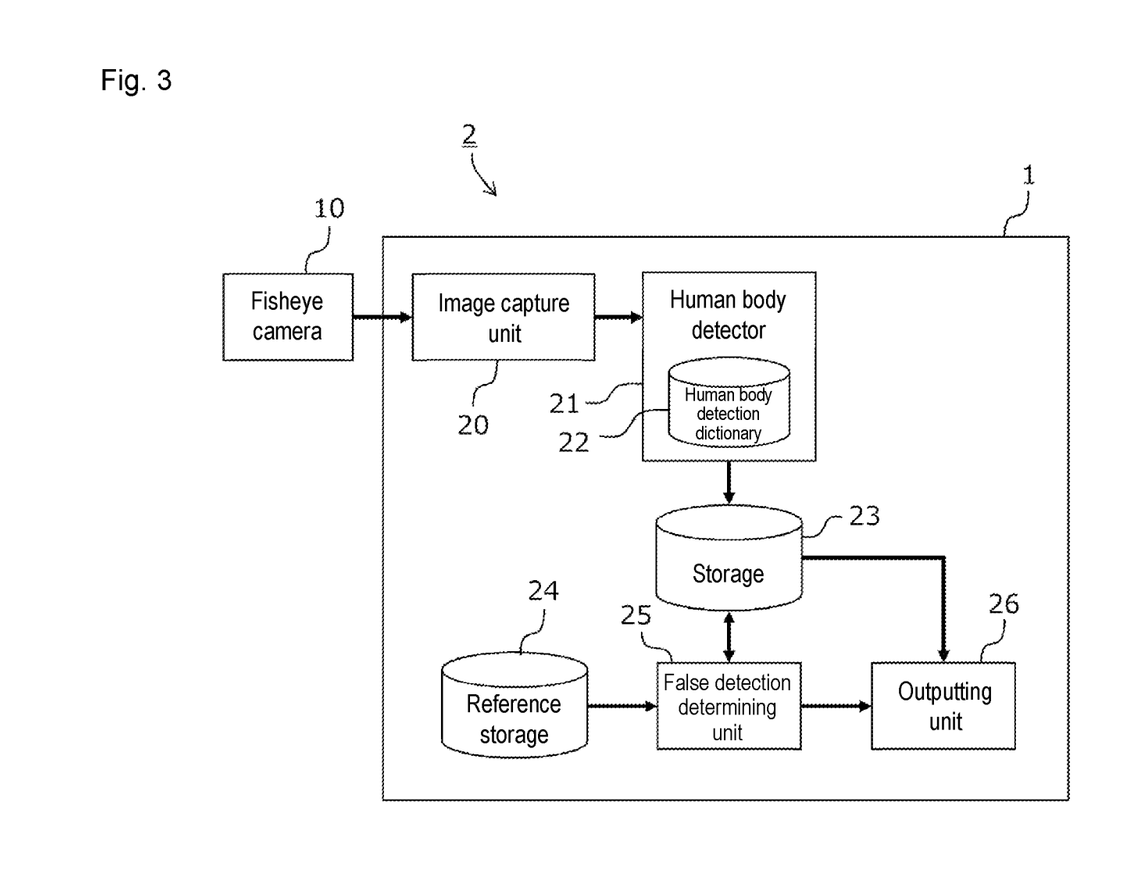
FIG. 3 is a diagram showing a structure of a monitoring system including the person detection device.

A description will be given of the embodiment of the present invention with reference to FIG. 3. FIG. 3 is a block diagram showing a structure of a monitoring system to which the person detection device according to the embodiment of the present invention is applied. A monitoring system 2 primarily includes the fisheye camera 10 and the person detection device 1.

The fisheye camera 10 is an imaging device including an optical system with a fisheye lens and an imaging element (an image sensor such as a CCD or CMOS). For example, as shown in FIG. 1, the fisheye camera 10 may be installed on, for example, the ceiling 12 of the to-be-detected area 11 with the optical axis directed vertically downward to take an omnidirectional (360-degree) image of the to-be-detected area 11. The fisheye camera 10 is connected to the person detection device 1 by wire (such as a USB cable or a LAN cable) or by radio (such as WiFi), and the person detection device 1 captures image data taken by the fisheye camera 10. The image data may be either a monochrome image or a color image, and the resolution, frame rate, and format of the image data are determined as desired. According to the embodiment, it is assumed that a monochrome image captured at 10 fps (10 images per second) is used.

The person detection device 1 according to the embodiment includes an image capture unit 20, a human body detector 21, a storage 23, a reference storage 24, a false detection determining unit 25, and an outputting unit 26. The image capture unit 20 has a capability of capturing the image data from the fisheye camera 10. The image data thus captured is passed to the human body detector 21. This image data may be stored in the storage 23. The human body detector 21 has a capability of detecting a human body candidate from the fisheye image by using an algorithm for detecting a human body. A human body detection dictionary 22 is a dictionary in which image features of human bodies appearing in the fisheye image are registered in advance. The storage 23 has a capability of storing the fisheye image, the detection result, and the like. The reference storage 24 has a capability of storing a reference (also referred to as a predicted value or a standard value) for the shape and/or size of the bounding box. This reference is preset before the monitoring system 2 is put into operation (for example, at the time of, for example, factory shipment, installation, or maintenance of the monitoring system 2). The false detection determining unit 25 has a capability of verifying the detection result from the human body detector 21 to determine the presence or absence of false detection. The outputting unit 26 has a capability of outputting information such as the fisheye image or the detection result to an external device. For example, the outputting unit 26 may display information on a display serving as the external device, transfer information to a computer serving as the external device, or send information or a control signal to a lighting device, an air conditioner, or an FA device serving as the external device.

The person detection device 1 may be, for example, a computer including a CPU (processor), a memory, a storage, and the like. This causes the structure shown in FIG. 3 to be implemented by loading a program stored in the storage into the memory and executing the program by the CPU. Such a computer may be a general-purpose computer such as a personal computer, a server computer, a tablet terminal, or a smartphone, or alternatively, an embedded computer such as an onboard computer. Alternatively, all or part of the structure shown in FIG. 3 may be implemented by an ASIC, an FPGA, or the like. Alternatively, all or part of the structure shown in FIG. 3 may be implemented by cloud computing or distributed computing.

<Person Detection Processing>

Figure 4:
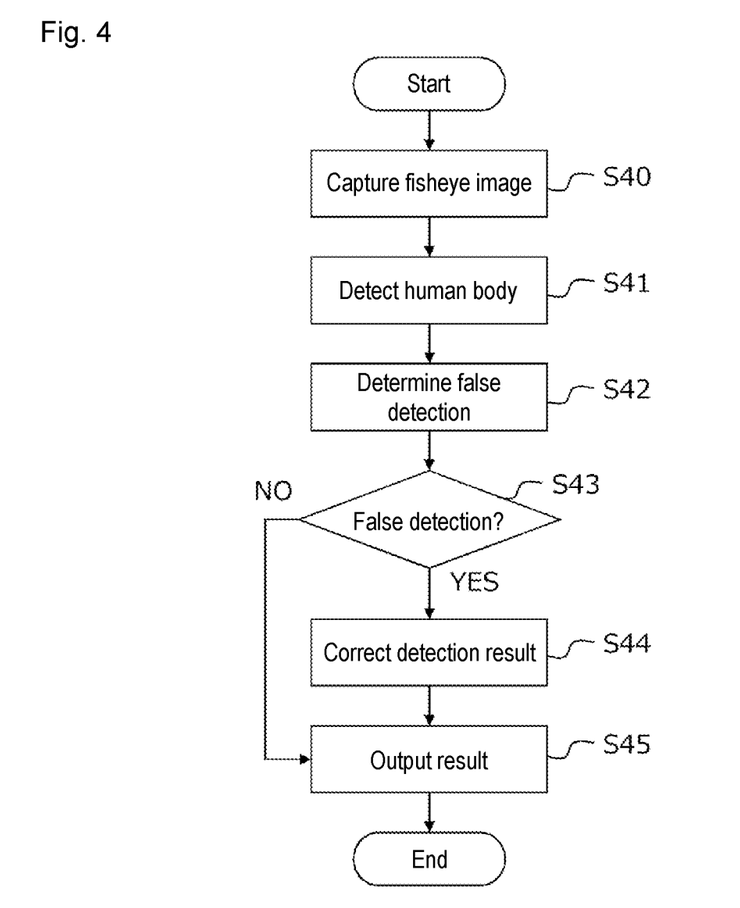
FIG. 4 is a flowchart of person detection processing.

FIG. 4 is a flowchart of the person detection processing to be executed by the monitoring system 2. A description will be given of an overall flow of the person detection processing with reference to FIG. 4. Note that the flowchart shown in FIG. 4 shows processing on the fisheye image for one frame. When the fisheye image is captured at 10 fps, the processing shown in FIG. 4 is executed 10 times per second.

First, the image capture unit 20 captures the fisheye image for one frame from the fisheye camera 10 (step S40). As described in BACKGROUND ART, in the related art, a plane-developed image that results from eliminating distortion from the fisheye image is created, and then image processing such as detection or recognition is executed, but the monitoring system 2 according to the embodiment executes detection or recognition processing on the fisheye image left as it is (left distorted).

Next, the human body detector 21 detects a human body from the fisheye image (step S41). When a number of people exist in the fisheye image, a number of human bodies are detected. Further, in many cases, a non-human body object (such as an electric fan, a desk chair, or a coat rack that resembles a human body in shape or color) may be falsely detected. The detection result from the human body detector 21 may contain such a non-human body object; therefore, the detection result is referred to as a "human body candidate" at this stage. The detection result may contain, for example, information on the bounding box indicating a region of the human body candidate thus detected and information on reliability of the detection (probability of being a human body). The information on the bounding box may contain, for example, center coordinates (x, y) (corresponding to a position where the human body candidate is detected), a height h, and a width w of the bounding box. The detection result is stored in the storage 23.

Figure 5:
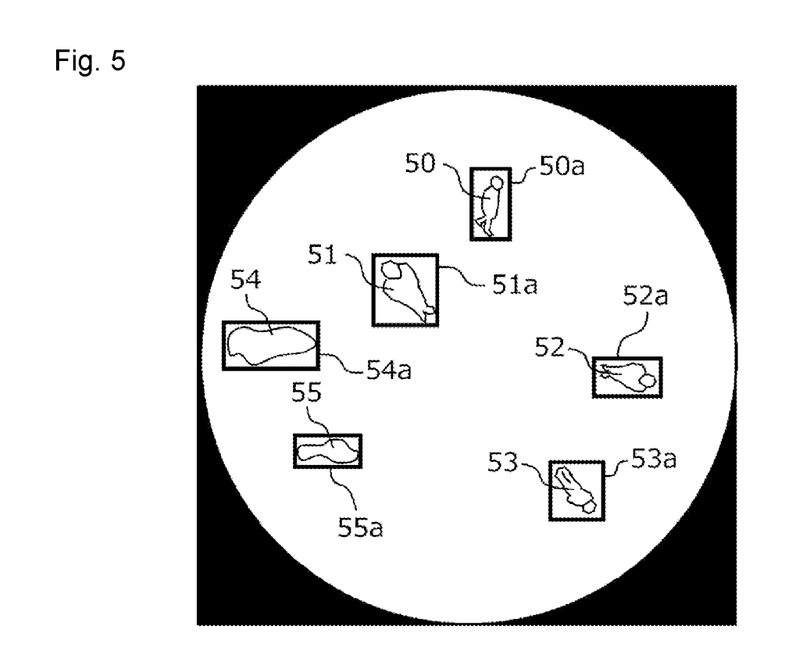
FIG. 5 is a diagram showing an example of a detection result from a human body detector.

FIG. 5 is an example of the detection result from the human body detector 21. In this example, in addition to human bodies 50, 51, 52, 53, non-human body objects 54, 55 have also been detected as human body candidates. Reference numerals 50a to 55a each denote a bounding box of a corresponding human body candidate.

Note that any algorithm may be applied to the human body detection. For example, a classifier that is a combination of image features such as HoG or Haar-like and Boosting may be applied, or human body recognition based on deep learning (for example, R-CNN, Fast R-CNN, YOLO, SSD, or the like) may be applied. According to the embodiment, the whole body of a person is detected as a human body, but the present invention is not limited to such detection, and part of the body such as the upper body may be detected.

Next, the false detection determining unit 25 compares each of the bounding boxes 50a to 55a contained in the detection result from the human body detector 21 with the reference set in the reference storage 24 to determine false detection (step S42). In the example shown in FIG. 5, the bounding boxes 54a, 55a do not satisfy the condition, and the human body candidates 54, 55 are determined to be results of false detection accordingly. Details of the false detection determination will be described later.

When a human body candidate determined to be a result of false detection (that is, determined to be not a human body) is found (YES in step S43), the false detection determining unit 25 corrects the detection result stored in the storage 23 (step S44). Specifically, the false detection determining unit 25 may eliminate information on the human body candidate determined to be a result of false detection from the detection result, or may lower the reliability of the human body candidate determined to be a result of false detection. Finally, the outputting unit 26 outputs the detection result to the external device (step S45). This is the end of the processing on the fisheye image for one frame.

In the person detection processing according to the embodiment, the fisheye image is analyzed as it is, and a person is detected directly from the fisheye image. This eliminates the need for preprocessing such as the plane development of the fisheye image or the elimination of distortion from the fisheye image, which allows high-speed person detection processing. The method under which the fisheye image is used as it is for the detection processing has a disadvantage that the method is lower in detection accuracy than the method under which the detection processing is executed after the plane development (the elimination of distortion); however, according to the embodiment, verifying the validity of the shape or size of the bounding box avoids false detection, which allows highly accurate detection.

<False Detection Determination>

A description will be given of a specific example of the false detection determination made by the false detection determining unit 25.

(1) Determination Based on Aspect Ratio

Figure 6:
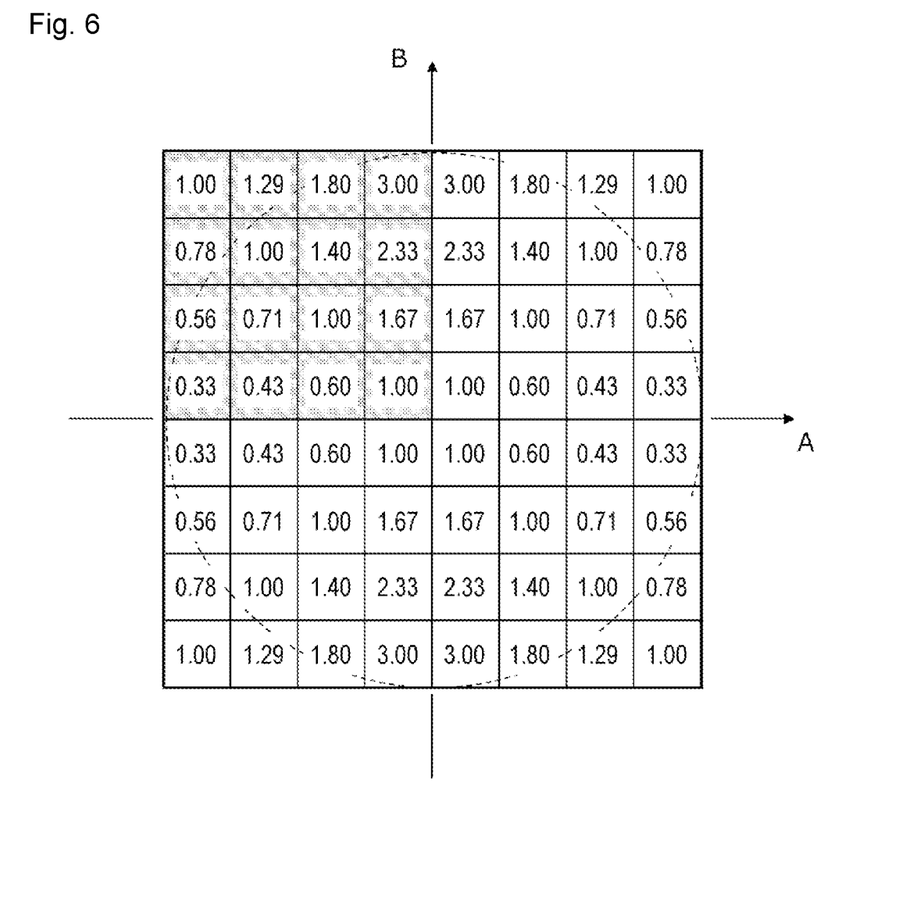
FIG. 6 is a diagram showing examples of a reference aspect ratio.

As described above, the fisheye image has a characteristic by which the aspect ratio of the bounding box changes in a manner that depends on the orientation relative to and the distance from the center of the image. This characteristic can be converted, by a calculation, into a numerical form in advance. FIG. 6 shows an example where the fisheye image is divided into 64 (8 by 8) small areas, and an aspect ratio h/w of each small area is calculated (h denotes the height of the bounding box in the y direction, and w denotes the width of the bounding box in the x direction). A table in which a reference value for the aspect ratio of each small area thus obtained (hereinafter referred to as a "reference aspect ratio") is defined may be stored in the reference storage 24. As shown in FIG. 6, with an A-axis and a B-axis defined, the A-axis and the B-axis passing through the center of the image and parallel to the x-axis and the y-axis, respectively, the reference aspect ratio differs symmetrically about the A-axis and the B-axis. The use of this symmetry allows the reference storage 24 to store only a table corresponding to a quadrant, one fourth, of the fisheye image (for example, a shaded portion shown in FIG. 6). This in turn allows a reduction in memory capacity.

Figure 7:
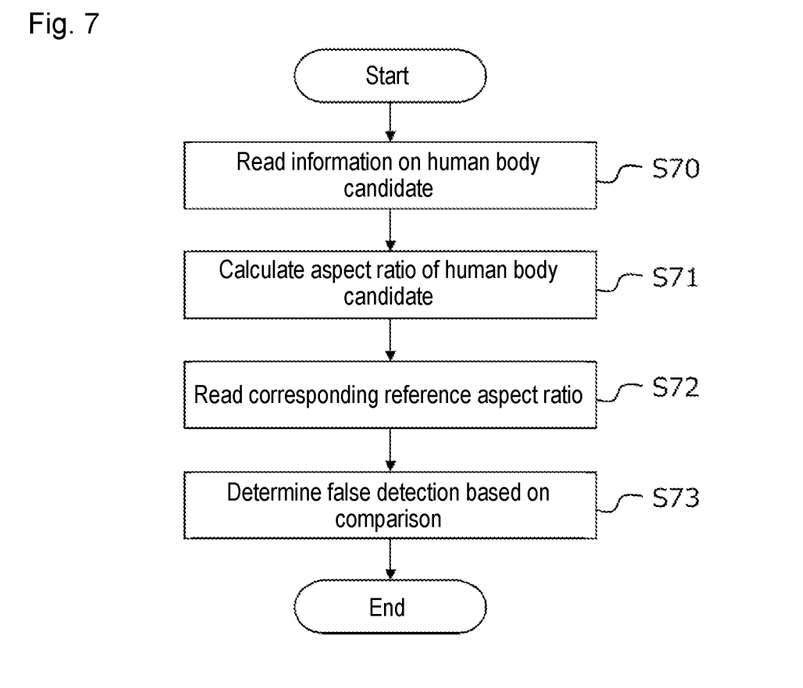
FIG. 7 is a flowchart of a false detection determination based on an aspect ratio.

FIG. 7 is a flowchart of false detection determination based on the aspect ratio. In step S70, the false detection determining unit 25 reads, from the storage 23, the information on the human body candidate detected in step S41 shown in FIG. 4. In step S71, the false detection determining unit 25 calculates the aspect ratio h/w of the bounding box of the human body candidate. In step S72, the false detection determining unit 25 reads, from the reference storage 24, the reference aspect ratio of the small area corresponding to the position where the human body candidate is detected (center coordinates of the bounding box). In step S73, the false detection determining unit 25 compares the aspect ratio of the human body candidate with the reference aspect ratio to determine whether the human body candidate is a human body or a result of false detection. Herein, for example, when a relative error REa in the aspect ratio of the human body candidate to the reference aspect ratio is equal to or less than a threshold Trea, the human body candidate is determined to be a "human body", and when the relative error REa is greater than the threshold Trea, the human body candidate is determined to be a result of "false detection".

For example, when the aspect ratio of the bounding box 51a of the human body candidate 51 shown in FIG. 5 is 1.02, and a corresponding reference aspect ratio is 1.00, the relative error REa is obtained as follows:

Relative error $RE_a = |1.02-1.00|/1.00 \times 100 = 2.0[\%]$.

For example, when the threshold Trea is 3%, the human body candidate 51 is determined to be a "human body". On the other hand, when the aspect ratio of the bounding box 55a of the human body candidate 55 is 0.48, and a corresponding reference aspect ratio is 0.71, the relative error REa is obtained as follows:

Relative error $RE_a = |0.48-0.71|/0.71 \times 100 = 32.4[\%]$.

Since REa is greater than Trea, the human body candidate 55 is determined to be a result of "false detection".

(2) Determination Based on Area

Figure 8:
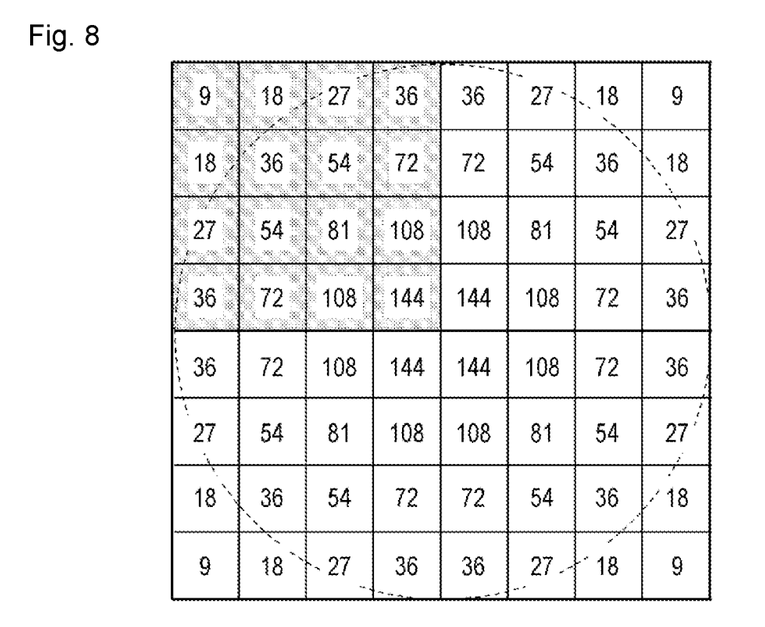
FIG. 8 is a diagram showing examples of a reference area.

As described above, the fisheye image has a characteristic by which the area of the bounding box changes in a manner that depends on the distance from the center of the image. This characteristic can be converted, by a calculation, into a numerical form in advance. FIG. 8 shows an example where the fisheye image is divided into 64 (8 by 8) small areas, and an area (number of pixels) of each small area is calculated. A table in which a reference value for the area of each small area thus obtained (hereinafter referred to as a "reference area") is defined may be stored in the reference storage 24. As shown in FIG. 8, the reference area differs symmetrically about the center of the image. The use of this symmetry allows the reference storage 24 to store only a table corresponding to a quadrant, one fourth, of the fisheye image (for example, a shaded portion shown in FIG. 8). This in turn allows a reduction in memory capacity.

Figure 9:
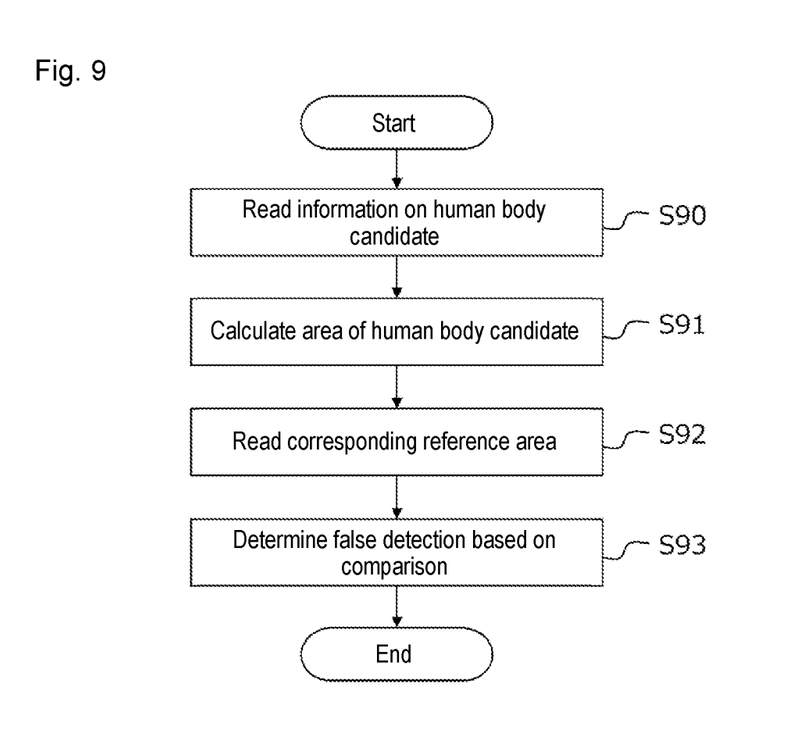
FIG. 9 is a flowchart of a false detection determination based on an area.

FIG. 9 is a flowchart of false detection determination based on the area. In step S90, the false detection determining unit 25 reads, from the storage 23, the information on the human body candidate detected in step S41 shown in FIG. 4. In step S91, the false detection determining unit 25 calculates the area of the bounding box of the human body candidate. In step S92, the false detection determining unit 25 reads, from the reference storage 24, the reference area of the small area corresponding to the position where the human body candidate is detected (center coordinates of the bounding box). In step S93, the false detection determining unit 25 compares the area of the human body candidate with the reference area to determine whether the human body candidate is a human body or a result of false detection. Herein, for example, when a relative error REs in the area of the human body candidate to the reference area is equal to or less than a threshold Tres, the human body candidate is determined to be a "human body", and when the relative error REs is greater than the threshold Tres, the human body candidate is determined to be a result of "false detection".

For example, when the area of the bounding box 51a of the human body candidate 51 shown in FIG. 5 is 130, and a corresponding reference area is 144, the relative error REs is obtained as follows:

Relative error REs=|130−144|/144×100=9.7[%].

For example, when the threshold Tres is 10%, the human body candidate 51 is determined to be a "human body". On the other hand, when the area of the bounding box 54a of the human body candidate 54 is 130, and a corresponding reference area is 72, the relative error REs is obtained as follows:

Relative error REs=|130−72|/72×100=80.6[%].

Since REs is greater than Tres, the human body candidate 54 is determined to be a result of "false detection".

(3) Determination Based on Both Aspect Ratio and Area

In order to increase the accuracy of the false detection determination, a combination of the above-described "(1) Determination based on aspect ratio" and "(2) Determination based on area" may be used.

As one of the specific methods, an error in aspect ratio and an error in area are individually evaluated, when both of the evaluations result in an affirmative determination, "human body" may be output as a determination result, and when either of the evaluations results in a negative determination, "false detection" may be output as the determination result. For example, a determination may be made based on the above-described relative error and threshold as follow:

when $REa \leq Trea$ and $REs \leq Tres$ are satisfied, it is determined to be a "human body", and when $REa > Trea$ or $REs > Tres$ is satisfied, it is determined to be a result of "false detection".

Alternatively, a total error, which is the sum of the error in aspect ratio and the error in area, may be evaluated to determine whether it is a "human body" or a result of "false detection". The following is an example where a determination is made by comparing, with a threshold Tre, a total error RE that results from weighting and adding up the two relative errors REa and REs. wa and wb denote weights, Total error $RE = wa \times REa + wb \times REs$, when $RE \leq Tre$ is satisfied, it is determined to be a "human body", and when $RE > Tre$ is satisfied, it is determined to be a result of "false detection".

<Others>

The above-described embodiment is merely illustrative of a configuration example according to the present invention. The present invention is not limited to the above-described specific forms, and various modifications may be made within the scope of the technical idea of the present invention. For example, the values in the tables shown in FIGS. 6 and 8, and the thresholds shown in the above-described embodiment are merely examples given for the description. Further, in the above-described embodiment, the bounding box having a quadrilateral shape has been given as an example, but a bounding box having a shape other than the quadrilateral shape (a polygon, an ellipse, a free-form figure, or the like) may be used. Further, in the above-described embodiment, the relative error in aspect ratio or area is evaluated, but an absolute error may be evaluated instead. In this case, it is preferable that the aspect ratio value be normalized by the maximum value or the area value be normalized by the area of the fisheye image.

<Appendix 1>

(1) A person detection device (1) configured to analyze a fisheye image obtained by a fisheye camera (10) installed above a to-be-detected area (11) to detect a person (13) existing in the to-be-detected area (11), the person detection device (1) including:

a human body detector (21) configured to detect a human body candidate from a fisheye image and output, as a detection result, a bounding box (14) indicating a region on the fisheye image of each human body candidate detected;

a reference storage (24) configured to prestore a reference for a shape and/or size of the bounding box for each position or area on the fisheye image; and a false detection determining unit (25) configured to compare the shape and/or size of the bounding box of the human body candidate contained in the detection result with the reference corresponding to a position where the human body candidate is detected to determine whether the human body candidate results from false detection.

(2) A person detection method for analyzing a fisheye image obtained by a fisheye camera (10) installed above a to-be-detected area (11) to detect a person existing in the to-be-detected area (11), the person detection method including the steps of:

detecting a human body candidate from a fisheye image and outputting, as a detection result, a bounding box indicating a region on the fisheye image of each human body candidate detected (S41); and comparing, by consulting a reference storage (24) configured to prestore a reference for a shape and/or size of the bounding box for each position or area on the fisheye image, the shape and/or size of the bounding box of the human body candidate contained in the detection result with the reference corresponding to a position where the human body candidate is detected to determine whether the human body candidate results from false detection (S42).

DESCRIPTION OF SYMBOLS 1 person detection device
2 monitoring system
10 fisheye camera
11 to-be-detected area
12 ceiling
13 person

The invention claimed is:

1. A person detection device configured to analyze a fisheye image obtained by a fisheye camera installed above a detection area to detect a person existing in the detection area, the person detection device comprising:
 a human body detector configured to detect a human body candidate from a fisheye image and output, as a detection result, a bounding box indicating a region on the fisheye image of each human body candidate detected;
 a reference storage configured to prestore a reference for a shape and/or size of the bounding box for each position or area on the fisheye image; and
 a false detection determining unit configured to compare the shape and/or size of the bounding box of the human body candidate contained in the detection result with the reference corresponding to a position where the human body candidate is detected to determine whether the human body candidate results from false detection,
 wherein the reference for the shape of the bounding box for a center area of the fisheye image and for an area located at an angle of 45 degrees with respect to the center area is set to be different from the reference for the shape of the bounding box for upper and lower areas relative to the center area and from the reference for the shape of the bounding box for left and right areas relative to the center area.

2. The person detection device according to claim 1, wherein
 the reference for the shape of the bounding box comprises a reference for an aspect ratio of the bounding box.

3. The person detection device according to claim 2, wherein
 the reference for the aspect ratio is set to cause the bounding box to have an approximately square shape in the center area of the fisheye image and in the area located at the angle of 45 degrees with respect to the center area, to cause the bounding box to have a vertically long rectangular shape in the upper and lower areas relative to the center area, and to cause the bounding box to have a horizontally long rectangular shape in the left and right areas relative to the center area.

4. The person detection device according to claim 1, wherein
 the reference for the size of the bounding box comprises a reference for an area of the bounding box.

5. The person detection device according to claim 4, wherein
 the reference for the area is set to make the area larger when the area is located closer to a center of the fisheye image.

6. The person detection device according to claim 1, wherein
 the false detection determining unit eliminates, from the detection result, a human body candidate determined to be a result of false detection.

7. The person detection device according to claim 1, wherein
 the detection result contains information on reliability of each human body candidate detected, and
 the false detection determining unit lowers the reliability of a human body candidate determined to be a result of false detection.

8. A person detection method for analyzing a fisheye image obtained by a fisheye camera installed above a detection area to detect a person existing in the detection area, the person detection method comprising the steps of:
 detecting a human body candidate from a fisheye image and outputting, as a detection result, a bounding box indicating a region on the fisheye image of each human body candidate detected; and
 comparing, by consulting a reference storage configured to prestore a reference for a shape and/or size of the bounding box for each position or area on the fisheye image, the shape and/or size of the bounding box of the human body candidate contained in the detection result with the reference corresponding to a position where the human body candidate is detected to determine whether the human body candidate results from false detection,
 wherein the reference for the shape of the bounding box for a center area of the fisheye image and for an area located at an angle of 45 degrees with respect to the center area is set to be different from the reference for the shape of the bounding box for upper and lower areas relative to the center area and from the reference for the shape of the bounding box for left and right areas relative to the center area.

9. A non-transitory computer readable medium storing a program for causing a computer to execute each of the steps of the person detection method according to claim 8.

* * * * *